United States Patent [19]
Mizugaki

[11] Patent Number: 5,487,157
[45] Date of Patent: Jan. 23, 1996

[54] MICROPROGRAMMED MICROCOMPUTER WITH HIGH-SPEED INTERRUPT FOR DRAM REFRESH

[75] Inventor: Shigeo Mizugaki, Hyogo, Japan

[73] Assignee: Mitsubishi Denki Kabushiki Kaisha, Tokyo, Japan

[21] Appl. No.: 248,793

[22] Filed: May 25, 1994

[30] Foreign Application Priority Data

Jun. 15, 1993 [JP] Japan .................................. 5-143466

[51] Int. Cl.⁶ .................................................. G06F 9/32
[52] U.S. Cl. ........................... 395/375; 395/550; 395/494
[58] Field of Search .................................... 395/162–166, 395/400, 425, 325, 375, 550, 800; 365/222; 364/200

[56] References Cited

U.S. PATENT DOCUMENTS 5,379,400 1/1995 Barakat et al. ......................... 395/425

OTHER PUBLICATIONS

*User's Manual*, M33300GS–20 (M32/ASSP), pp. 38, 39.
*Microprocessor*, Nikkei Data Pro, Dec. 1990, PD70208(V40).

Primary Examiner—Mark R. Powell
Assistant Examiner—Kee M. Tung
Attorney, Agent, or Firm—Townsend and Townsend and Crew

[57] ABSTRACT

To speed up switch between the use of a data bus by CPU for reading and writing data and the use of the data bus for refreshing a DRAM in a microcomputer having a DRAM refresh function, a terminal count signal 20 which is activated by a refresh timer 9 when a memory subsystem 8 composed of an external DRAM needs to be refreshed is directly input into a microinstruction sequencer 15 for controlling the order of executing a set of microinstructions of CPU 2. Therefore, CPU 2 can interrupt the execution of a set of microinstructions to execute a refresh cycle and can resume the execution of the interrupted set of microinstructions as controlled by the microinstruction sequencer 15 after the refresh cycle is finished.

10 Claims, 6 Drawing Sheets

MICROPROGRAMMED MICROCOMPUTER WITH HIGH-SPEED INTERRUPT FOR DRAM REFRESH

BACKGROUND OF THE INVENTION

1. Field of the Invention

The present invention relates to a microcomputer for executing instructions in accordance with a microprogram system and having a function to control generation of a refresh cycle for a dynamic RAM (hereinafter referred to as "DRAM").

2. Description of the Prior Art

A constituent element of a microcomputer which fetches, interprets and executes instructions from outside is referred to as "CPU", and an entire apparatus including this CPU and a DRAM refresh controller as "microcomputer" hereinafter.

The CPU receives and supplies data through a data bus under the control of a bus interface control unit provided herein in order to fetch instructions and read and write data. The DRAM also uses the data bus under the control of a different bus interface control unit during a refresh cycle. Since there exist both the bus interface control unit of the CPU and the bus interface control unit of the DRAM refresh controller, the microcomputer requires an arbitration control unit for arbitrating the use of the data bus between the CPU and the DRAM refresh controller.

FIG. 6 is a block diagram of a microcomputer including a conventional DRAM refresh controller and an external memory formed with DRAM. In FIG.6, reference numeral 1 represents a DRAM refresh controller, 2 a CPU, and 3 a microcomputer. Numeral 4 represents an internal data bus in the microcomputer 3, 5 a bus arbiter for arbitrating the use of the bus between the DRAM refresh controller 1 and the CPU 2, 6 a data bus input and output unit connected between the internal data bus 4 and the external data bus 7 of the microcomputer 3, 8 an external memory subsystem composed of DRAM connected to the external data bus 7, 9 a refresh timer in the DRAM refresh controller 1 for counting the interval of a DRAM refresh cycle and generating a terminal count signal when it finishes counting, and 10 a bus interface control unit in the DRAM refresh controller 1 responsive to the terminal count signal of the refresh timer to control the use of the internal data bus 4. Numeral 11 designates the terminal count signal indicating the time to refresh the DRAM after the termination of the count operation of the refresh timer, 12 a signal indicating a request that the DRAM refresh controller 1 use the internal data bus 4 for refreshing the memory subsystem 8, which is a bus access request signal to be applied to the bus arbiter 5, 13 a bus access permit signal indicating permission for the CPU 2 to use the internal data bus 4, 14 a control storage unit for storing a set of microinstructions specifying the internal operation of the CPU 2, 15 a microinstruction sequencer as means for controlling the order of executing a set of microinstructions stored in the control storage unit 14 by specifying an address, 16 an instruction execution unit for executing the instructions of the CPU 2 under the control of contents of the microinstructions output from the control storage unit 14, 17 a bus interface control unit in the CPU 2, connected between the instruction execution unit 16 and the internal data bus 4 for controlling the use of the internal data bus 4 by the CPU 2, and 18 a bus request signal indicating a request issued by the instruction execution unit 16 to the bus interface control unit 17 when the CPU 2 is to use the internal data bus 4 for reading and writing data for the execution of instructions.

A description will subsequently be given of the operation of the microcomputer with reference to FIG.6. The operation of the microcomputer when the memory subsystem 8 composed of a DRAM does not need to be refreshed will first be described. The refresh timer 9 continues counting until the refresh operation is needed, and the terminal count signal 11 is inactive (invalid). Therefore, the bus interface control unit 10 in the DRAM refresh controller 1 keeps the bus access request signal 12 inactive with respect to the bus arbiter 5. For this reason, the bus arbiter 5 continues to generate to the CPU 2 the bus access permit signal 13 indicating that the CPU 2 may use the internal data bus 4.

Meanwhile, the CPU 2 may access the memory subsystem 8 through the internal data bus 4 to execute instructions in some cases. The CPU 2 reads microinstructions from the control storage unit 14 in the order controlled by the microinstruction sequencer 15. When it is necessary to read and write data, the microinstructions notify the instruction execution unit 16 of this. Then the instruction execution unit 16 activates the bus request signal 18 and notifies the bus interface control unit 17 that the CPU 2 needs to use the internal data bus 4. Since the bus access permit signal 13 is active, the bus interface control unit 17 can respond to the bus request signal 18, that is, a bus access request from the instruction execution unit 16. Therefore, the bus interface control unit 17 uses the internal data bus 4 to read data from and write data to the memory subsystem 8 through the data bus input and output unit 6 and the external data bus 7.

A description will subsequently be given of the operation of the microcomputer when the memory subsystem 8 composed of a DRAM needs to be refreshed. Generally speaking, the operation of refreshing the DRAM needs to be executed first before any other operation. Therefore, in this case, the use of the internal data bus 4 for refreshing the DRAM comes prior to the use of the internal data bus 4 by the CPU 2 for reading and writing data.

The refresh timer 9 counts the time for refreshing the memory subsystem 8. The refresh timer 9 activates the count signal 11 when there is an overflow (or an underflow when it counts backwards), and notifies the bus interface control unit 10 that it is time to refresh the memory subsystem 8. At this time, the bus interface control unit 10 activates the bus access request signal 12 and notifies the bus arbiter 5 that the top priority should be given to the use the internal data bus 4 for refreshing. Thereby, the bus arbiter 5 makes the bus access permit signal 13 inactive to the CPU 2 and notifies the CPU 2 that the CPU 2 cannot use the internal data bus 4.

With the above operation flow, access to the internal data bus 4 is shifted to the DRAM refresh controller 1, whereby the bus interface control unit 10 uses the internal data bus 4 to refresh the memory subsystem 8 through the data bus input and output unit 6 and the external data bus 7.

A description will subsequently he given of the operation of the microcomputer when the CPU 2 needs to use the internal data bus 4 during the above-described refresh cycle. The operation of the microcomputer until the CPU 2 activates the bus request signal 18 is perfectly identical to the case where the memory subsystem 8 does not need to be refreshed. Since the bus arbiter 5 keeps the bus access permit signal 13 inactive during the refresh cycle, the bus interface control unit 17 cannot allow the instruction execution unit 16 to read and write data and waits for the bus access permit signal 13 to become active again. Therefore, the CPU 2 (instruction execution unit 16) cannot receive and supply required data and is kept in a waiting state, that is, in an operation suspended state.

Since the conventional microcomputer having a DRAM refresh function is structured as described above, the use of the data bus by the CPU for reading and writing data and the use of the data bus for refreshing the DRAM are determined by the arbitration of the bus arbiter, whereby the ON/OFF operations of the DRAM refresh controller and the bus interface control units are controlled. Therefore, arbitration takes an extremely long time. Furthermore, the DRAM refresh controller and the CPU each require an independent bus interface control unit and a bus arbiter, thus increasing the number of hardwares.

SUMMARY OF THE INVENTION

An object of the present invention, made to solve the above problems in the prior art, is to provide a microcomputer having a DRAM refresh function, which can switch the use of the data bus by the CPU for reading and writing data and the use of the data bus for refreshing a DRAM at high speed with a simple hardware.

According to the present invention, there is provided a microcomputer wherein, when the built-in refresh timer for measuring the interval of a DRAM refresh cycle reaches a predetermined count value, a termination signal is applied to the microinstruction sequencer, and the CPU interrupts the execution of a set of microinstructions on receiving the signal, starts the refresh operation, and resumes the execution of the set of microinstructions when the refresh operation is completed.

In the microcomputer of the present invention, the built-in refresh timer directly notifies the microinstruction sequencer that it is time to refresh the DRAM so that the execution of an instruction is interrupted, refreshing of the DRAM is executed, and the execution of the instruction is resumed after the refresh cycle. Therefore, arbitration of access to the data bus is performed at high speed.

The above and other objects, features and advantages of the invention will become more apparent from the following description when taken in conjunction with the accompanying drawings.

DESCRIPTION OF THE PREFERRED EMBODIMENT

Embodiment 1

Figure 1:
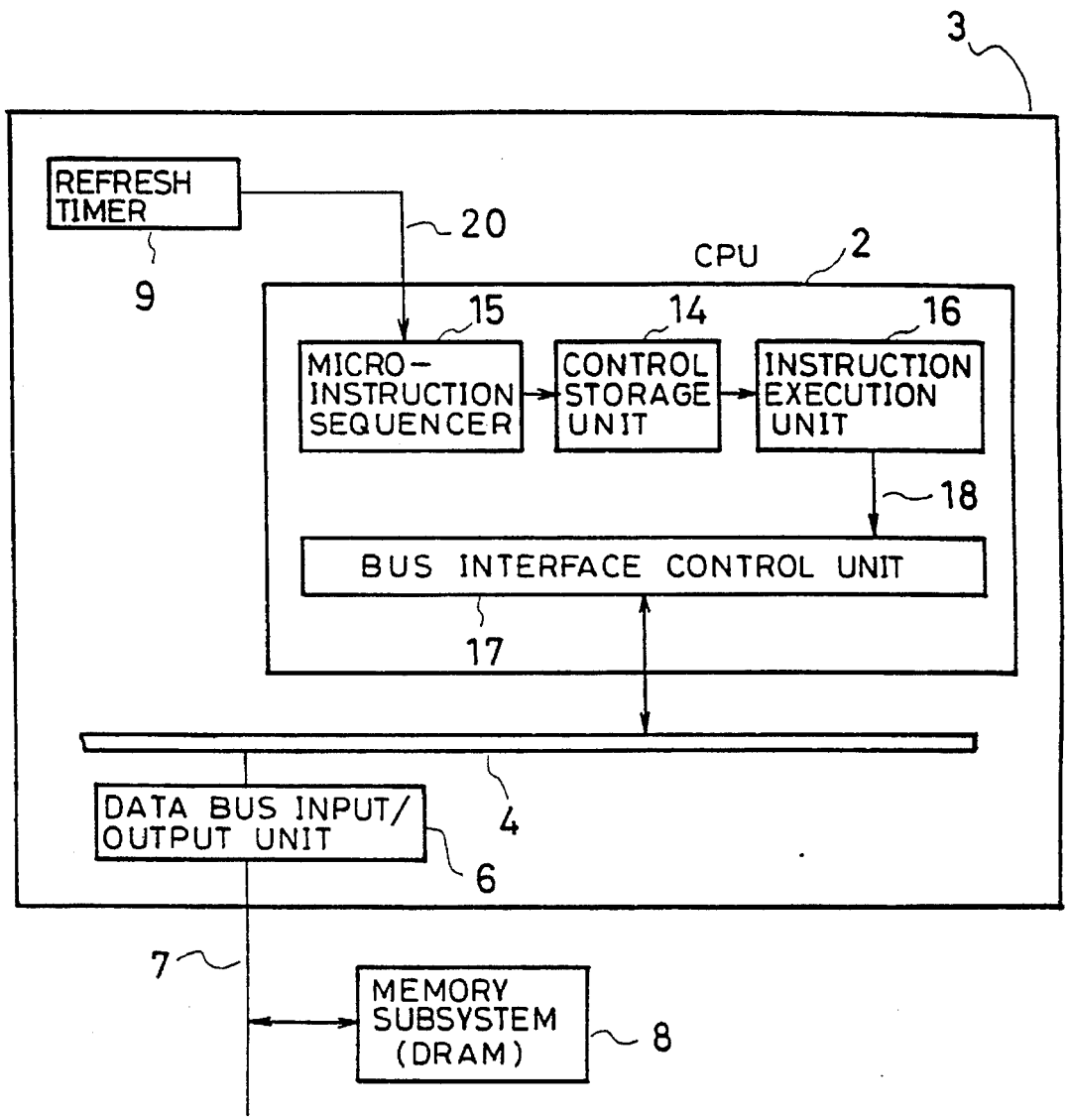
FIG. 1 is a block diagram of the internal configuration of a microcomputer having a DRAM refresh function according to a first embodiment of the present invention.
Figure 6:
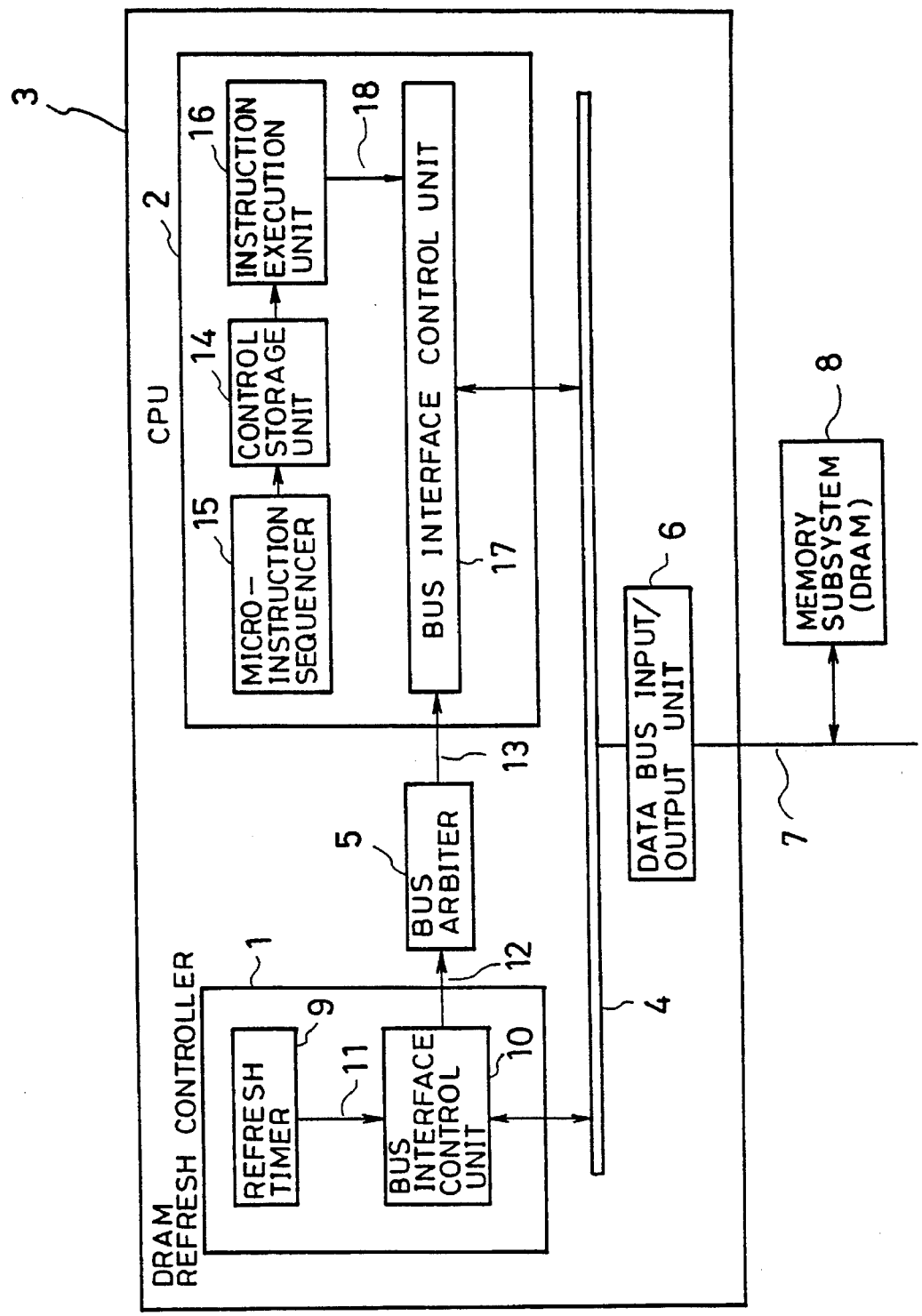
FIG. 6 is a block diagram of the internal configuration of a microcomputer having a DRAM refresh function of the prior art.

Referring to the accompanying drawings, a microcomputer as a preferred embodiment of the present invention will be described. FIG. 1 is a block diagram of a microcomputer having a DRAM refresh function according to a first embodiment of the present invention. In FIG. 1, the CPU 2, the internal data bus 4, the data bus input and output unit 6, the external data bus 7, the memory subsystem 8, the control storage unit 14, the microinstruction sequencer 15, the instruction execution unit 16, the bus interface control unit 17, and the bus request signal 18 are corresponds to those of FIG. 6. Reference numeral 9 represents a refresh timer for measuring the interval of a DRAM refresh cycle, and 20 a terminal count signal which is generated by the refresh timer 9 when it reaches a predetermined count value and applied to the microinstruction sequencer 15 of the CPU 2.

Figure 2:
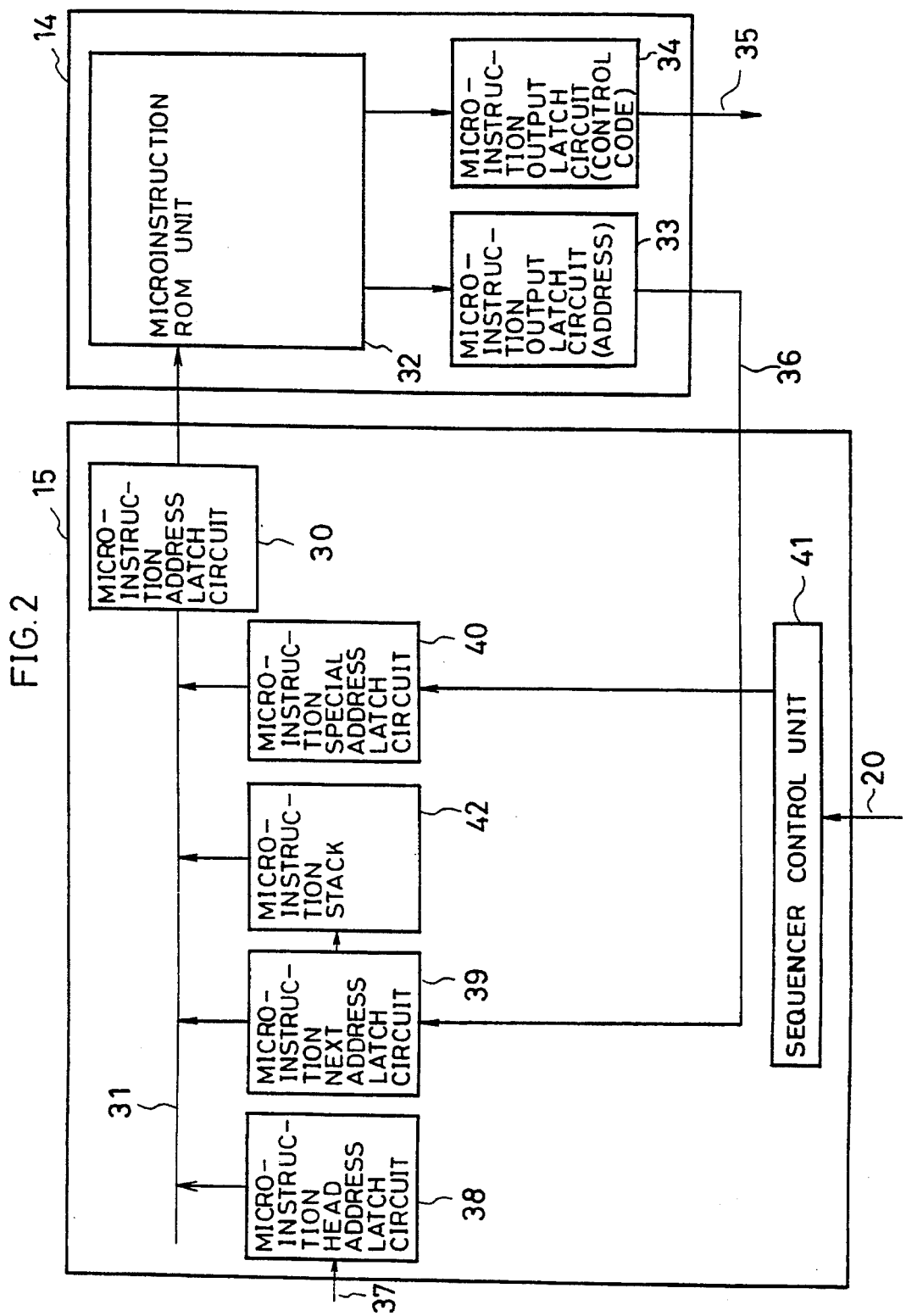
FIG. 2 is a block diagram of the internal configurations of a microinstruction sequencer and a control storage unit of the microcomputer having the DRAM refresh function according to the first embodiment.

FIG. 2 is a block diagram of the configurations of the microinstruction sequencer 15 and the control storage unit 14 of FIG. 1. In FIG. 2, reference numeral 30 represents a microinstruction address latch circuit for holding an address in the control storage unit 14, 31 a microinstruction address bus for transferring the address latched in the microinstruction address latch 30, 32 a microinstruction ROM unit for storing microinstructions, which comprises an address decoder, a memory array, a read circuit and the like, 33 a microinstruction output latch circuit for holding the address of a microinstruction output from the microinstruction ROM unit 32 and to be executed next, 34 a microinstruction output latch circuit for holding a control code from the microinstruction ROM unit 32 controlling the operation of an arithmetic unit in the instruction execution unit 16, 35 a control signal for controlling the operation of the instruction execution unit 16, 36 a next address signal output from the microinstruction output latch circuit 33 and indicating the address of a microinstruction to be executed next in the microinstruction ROM unit 32, 37 a head address signal indicating the head address of a set of microinstructions corresponding to an instruction of the CPU, 38 a microinstruction head address latch circuit for holding the head address signal 37, 39 a microinstruction next address latch circuit for holding the next address signal 36, 40 a microinstruction special address latch circuit for generating and holding the head address of another set of microinstructions for the refresh operation, and 41 a sequencer control unit for controlling which contents among the following are to be output to the microinstruction address bus 31: the microinstruction head address latch circuit 38, the microinstruction next address latch circuit 39, the microinstruction special address latch circuit 40, or a microinstruction stack 42 to be described below. 42 designates the microinstruction stack for temporarily saving the contents of the microinstruction next address Latch circuit 39.

Figure 3:
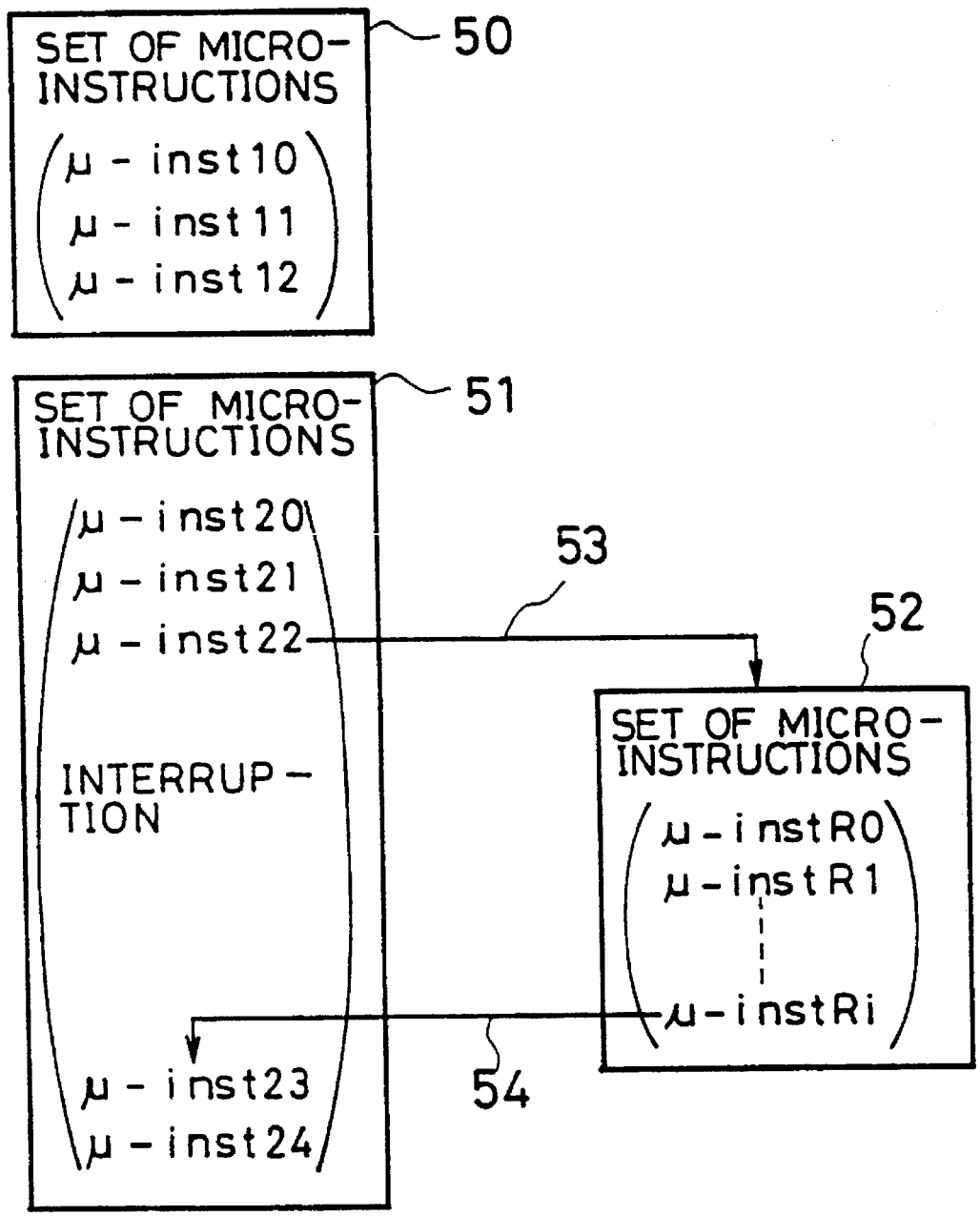
FIG. 3 is a diagram showing a set of microinstructions of the microcomputer having the DRAM refresh function according to the first embodiment.

FIG. 3 is an example showing how the execution order of of a set of microinstructions is controlled. In FIG. 3, reference numeral 50 designates a set of microinstructions corresponding to an instruction in the CPU 2 (instruction A), 51 a set of microinstructions corresponding to another instruction in the CPU 2 (instruction B), 52 a set of microinstructions for generating a DRAM refresh cycle, 53 shift from the set of microinstructions 51 to the set of microinstructions 52, and 54 return from the set of microinstructions 52 to the set of microinstructions 51, A description will subsequently be given of the procedure of executing microinstructions by the CPU 2 when a DRAM refresh cycle is not generated in the first embodiment of the present invention, with reference to FIGS. 1 to 3, At this time, the terminal count signal 20 is inactive invalid, and the sequencer control unit 41 recognizes that there is no refresh cycle. The CPU 2 fetches the above-mentioned instruction A from the memory subsystem 8 composed of a DRAM or another memory system, generates the head address signal 37 of the set of microinstructions 50, that is, the storage address of µ-inst10 (µ-inst represents a microinstruction and other microinstructions are expressed likewise hereinafter), in the microinstruction ROM unit 32, and stores the signal in the microinstruction head address latch circuit 38, The contents of the microinstruction head address latch circuit 38 are controlled by the sequencer control unit 41 and transferred through the microinstruction address bus 31 and the microinstruction address latch circuit 30 to the microinstruction ROM unit 32.

As the result, the contents of the µ-inst10 and the storing address of µ-inst11 are read from an address in the microinstruction ROM unit 32 specified by the microinstruction head address latch circuit 38. The contents of the µ-inst10 are held in the microinstruction output latch circuit 34 and further become the control signal 35 for the instruction execution unit 16. The storage address of the µ-inst11 read at the same time is held in the microinstruction output latch circuit 33 and becomes next address signal 36 to be transferred to the microinstruction next address latch circuit 39.

When reading of the above-mentioned µ-inst10 is completed, reading of the next microinstruction (µ-inst11) is started. If the sequencer control unit 41 recognizes that the microinstruction (µ-inst11) to be processed next is not the first microinstruction of a CPU instruction, it calls the contents of the microinstruction next address latch circuit 39, that is, the storage address of the µ-inst11, to be output to the microinstruction address bus 31. The contents of the microinstruction next address latch circuit 39 are further supplied to the microinstruction ROM unit 32 at an address specified by the microinstruction next address latch circuit 39.

As the result, the contents of the µ-inst11 and the address of the µ-inst12 are read from the address in the microinstruction ROM unit 32 specified by the microinstruction next address latch circuit 59. The same procedure is repeated to read the µ-inst12.

In this case, when the sequencer control unit recognize that the µ-inst12 is the last of the set of microinstructions corresponding to the instruction A, the next microinstruction address is specified by the microinstruction head address latch circuit 38. At this time, the contents of the microinstruction head address latch circuit 38 are changed to the head address signal 37 indicating the head address of the set of microinstructions 51 corresponding to the instruction B fetched by the CPU 2, that is, the storage address of µ-inst20 in the microinstruction ROM unit 32. The read operation of the set microinstructions 51 (µ-inst20, 21, . . . ) corresponding to the instruction B can be performed in the same way as the read operation of the set of microinstructions 50 (µ-inst10, 11, 12) corresponding to the instruction A.

What has been described above is the procedure of executing the microinstructions of the CPU 2 when a DRAM refresh cycle is not generated. In this case, the microinstruction special address latch circuit 40 and the microinstruction stack 42 are not used at all.

The procedure of executing the microinstructions of the CPU 2 when a DRAM refresh cycle is required in the first embodiment of the present invention will be descried with reference to FIGS. 1 to 3. The refresh timer 9 counts time based on a reference clock signal. When the refresh timer 9 overflows (or underflows in the case it counts backward), it is time to refresh the memory subsystem 8 composed of a DRAM, and the terminal count signal 20 is activated, whereby the sequencer control unit 41 is notified that generation of refresh cycle is required.

As shown in FIG. 3, it is supposed that the microinstruction sequencer 15 is executing the µ-inst22 when it receives the terminal count signal 20 which has been made active. At this time, the storage address of the µ-inst22 is held in the microinstruction address latch circuit 30, and the contents of the µ-inst22 and the storage address of the µ-inst23 are read from this address in the microinstruction ROM unit 32.

The storage address of the µ-inst23 is transferred through the microinstruction output latch circuit 33 to the microinstruction next address latch circuit 39 as the next address signal 36. However, when the sequencer control unit 41 in the microinstruction sequencer 15 receives the terminal count signal 20 which has been made active, it causes the contents of the microinstruction next address latch circuit 39 to be transferred not to the microinstruction address bus 31 but to the microinstruction stack 42 unlike the case where no DRAM refresh cycle is generated. Furthermore, the sequencer control unit 41 causes the contents of the microinstruction special address latch circuit 40 and not the contents of the microinstruction next address latch circuit 39 to be output to the microinstruction address bus 31. The microinstruction special address latch circuit 40 always holds the head address of the set of microinstructions 52 for generating a refresh cycle, that is, the address of the µ-instR0, in the microinstruction ROM unit 32.

In this way, the contents of the microinstruction special address latch circuit 40 are transferred through the microinstruction address bus 31 and the microinstruction address latch circuit 30 to the microinstruction ROM unit 32. As the result, the contents of the µ-instR0 and the storage address of the µ-instR1 are read from the address in the microinstruction ROM unit 32 specified by the microinstruction special address latch circuit 40, whereby the execution of the set of microinstructions 51 is interrupted and instead the execution of the set of microinstructions 52 for generating a refresh cycle is started. Since the operation of the microinstruction sequencer 15 from the start of executing the set of microinstructions 52 is the same as that in the case where no DRAM refresh cycle is generated, the microinstruction stack 42 is not used and the storage address of the µ-inst23 is kept in the microinstruction stack 42.

When the sequencer control unit 41 identifies the final microinstruction µ-instRi of the set of microinstructions 52 for generating a refresh cycle, it causes the contents of the microinstruction stack 42 to be output to the microinstruction address bus 31 for the specification of the next microinstruction address. For this reason, the contents of the microinstruction stack 42, that is, the address of the µ-inst23 in the microinstruction ROM unit 32, is transferred through the microinstruction address bus 31 and the microinstruction address latch circuit 30 to the microinstruction ROM unit 32. As the result, the contents of the µ-inst23 are read and the execution of the set of microinstructions 51 which has been interrupted is resumed.

Embodiment 2

Figure 4:
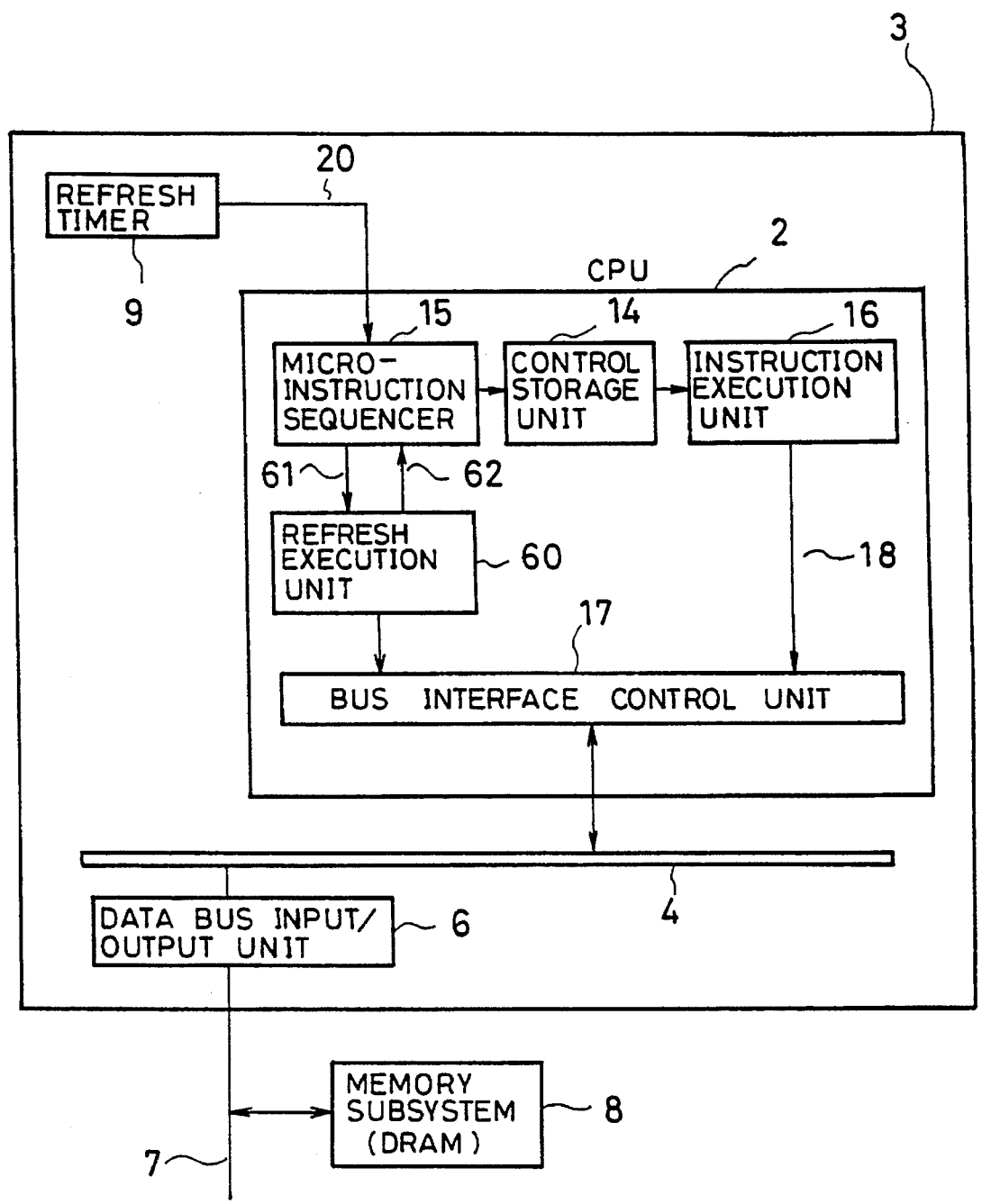
FIG. 4 is a block diagram of the internal configuration of a microcomputer having a DRAM refresh function according to a second embodiment of the present invention.

FIG. 4 is a block diagram of a microcomputer having a DRAM refresh function and an external memory composed with DRAM according to a second embodiment of the present invention. In FIG. 4, reference numeral 60 represents a refresh execution unit in which the operation of refreshing DRAM is effected by hardware, that is, a logic circuit, 61 a refresh request signal indicating a request from the microinstruction sequencer 15 to start the operation of the refresh execution unit 60, and 62 a refresh completion signal which is used to inform the microinstruction sequencer 15 of the completion of the operation of the refresh execution unit 50. Other reference numerals represent the same or corresponding elements of FIG. 1.

Figure 5:
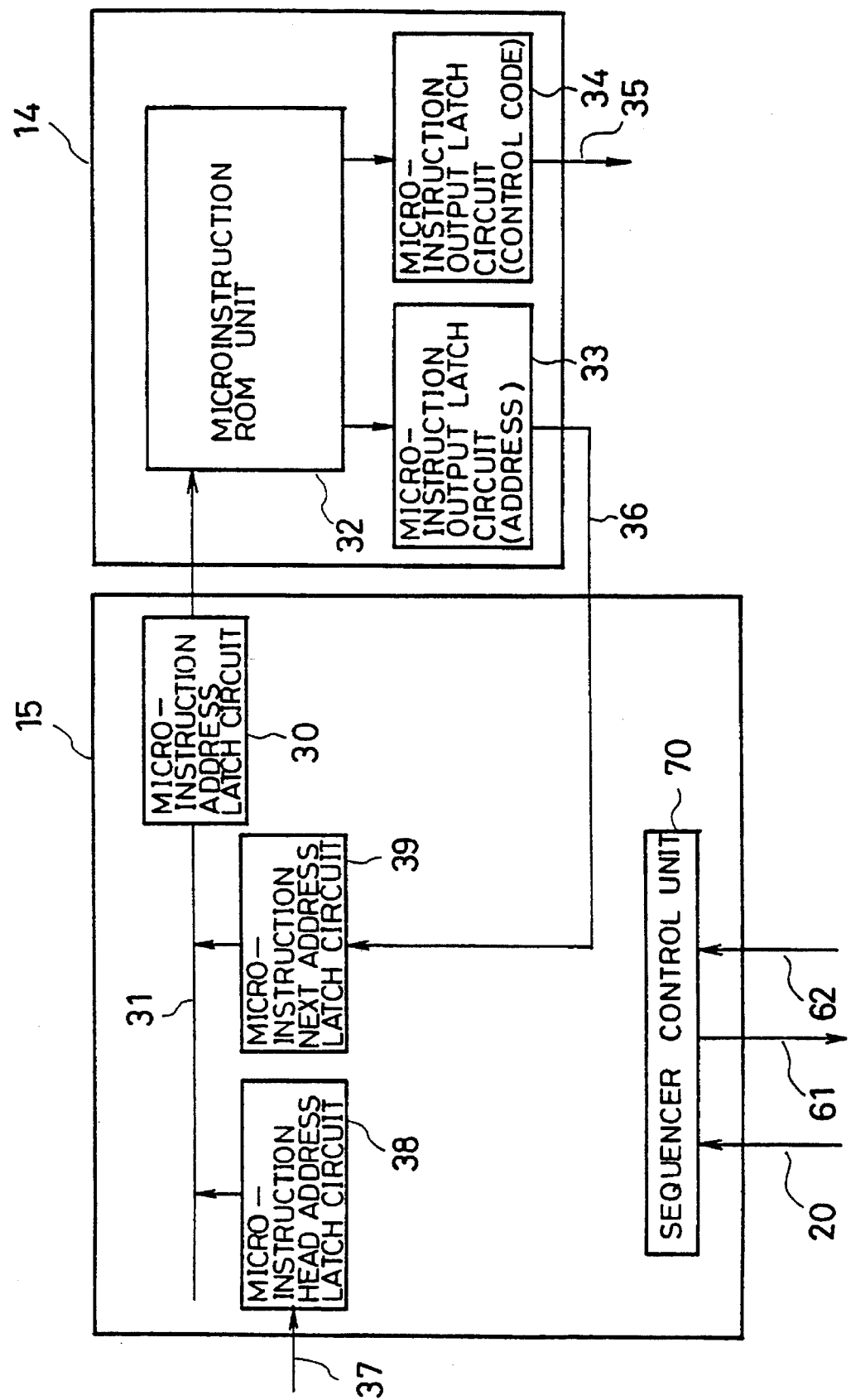
FIG. 5 is a block diagram of the internal configurations of a microinstruction sequencer and a control storage unit of the microcomputer having the DRAM refresh function according to the second embodiment.

FIG. 5 is a block diagram of the internal configurations of the microinstruction sequencer 15 and the control storage unit 14 of FIG. 4. In FIG. 5, reference numeral 70 designates a sequencer control unit which performs almost the same operation as the element 41 of FIG. 2, but differs in that it controls which contents of the microinstruction head address latch circuit 38 or the microinstruction next address latch circuit 39 will be output to the microinstruction addresses bus 31, and that it controls the suspension of the operation of the whole microinstruction sequencer 15 during the operation of the refresh execution unit 50. Other reference numerals represent the same or corresponding elements as in FIG. 2.

The procedure of executing microinstructions of the CPU 2 when no DRAM refresh cycle is generated according to the second embodiment of the present invention will be described next. The operation of the microcomputer in this case is perfectly to the operation when no DRAM refresh cycle is generated in the first embodiment of the present invention.

The operation of the CPU 2 when generation of a DRAM refresh cycle is required in the second embodiment of the present invention will be described with reference to FIGS. 3 to 5. The refresh timer 9 counts time based on a reference clock signal. When it overflows (or underflows when it counts backward), it is time to refresh the memory subsystem 8 composed of a DRAM. Therefore, the terminal count signal 20 is activated, whereby the sequencer control unit 70 is notified that it is necessary to generate a refresh cycle.

As in the first embodiment of the present invention described above, it is supposed that the microinstruction sequencer 15 is executing the μ-inst22 when it receives the terminal count signal 20 which has been activated as shown in FIG. 3. At this time; the storage address of the, μ-inst22 is held in the microinstruction address latch circuit 30, and the contents of the μ-inst22 and the storage address of the μ-inst23 are read from this address in the microinstruction ROM unit 32.

The storage address of the μ-inst23 is transferred through the microinstruction output latch circuit 33 to the microinstruction next address latch circuit 39 as the next address signal 36. However, when the sequencer control unit 70 in the microinstruction sequencer 15 receives the terminal count signal 20 which has been made active, it stops the operation of the entire microinstruction sequencer 15, interrupts the execution of the set of microinstructions 51, activates the refresh request signal 61, and starts the operation of the refresh execution unit 60 unlike the case where no DRAM refresh cycle is generated. In this case, the contents of the microinstruction next address latch circuit 39 are not output to the microinstruction address bus 31 but maintained.

Due to the stopped operation of the microinstruction sequencer 15, the instruction execution unit 16 also stops operation and, accordingly, the instruction execution unit 16 does not use the internal data bus 4. For this reason, the refresh execution unit 60 may use the internal data bus 4 through the bus interface control unit 17 for refreshing the DRAM without waiting for arbitration.

After generation of a refresh cycle is completed, the refresh execution unit 60 activates the refresh completion signal 62. On receiving the refresh completion signal 62, the sequencer control unit 70 in the microinstruction sequencer 15 inactivates the refresh request signal 61 to resume the operation of the entire microinstruction sequencer 15. At this time, the contents of the microinstruction next address latch circuit 39 (storage address of the μ-inst23 in the microinstruction ROM unit 32) are transferred through the microinstruction address latch circuit 30 to the microinstruction ROM unit 32. As the result, the contents of the μ-inst23 are read and the execution of the set of microinstructions 51 which has been interrupted is resumed.

As described on the foregoing pages, according to the present invention, CPU in the microcomputer having a DRAM refresh function is arranged such that instruction execution thereof is interrupted when a refresh cycle is required and resumed when the refresh cycle is finished. Therefore, the use of the data bus by CPU for reading and writing data and the use of the data bus for refreshing DRAM can be switched without the use of the arbiter, thus significantly increasing switching speed, reducing the number of hardwares due to the elimination of the bus arbiter, and constructing a system at a low cost.

What is claimed is:

1. A microcomputer having a refresh function and comprising:

a CPU including a control storage unit for storing a set of microinstructions and control means for controlling the order of executing microinstructions by specifying addresses for storing the set of microinstructions, and a timer for specifying a time interval of a refresh cycle for a dynamic memory, wherein a count termination signal of said timer is input into said control means;

wherein said CPU receives the count termination signal of said timer applied to said control means therein, interrupts the execution of a set of microinstructions, executes another set of microinstructions for generating a refresh cycle, and resumes the execution of the set of microinstructions when the execution of the set of microinstructions for generating the refresh cycle is completed.

2. A microcomputer having a refresh function and comprising:

a CPU including a control storage unit for storing a set of microinstructions and control means for controlling the order of executing microinstructions by specifying addresses for storing the set of microinstructions, and a timer for specifying a time interval of a refresh cycle for a dynamic memory, wherein a count termination signal of said timer is input into said control means;

wherein said CPU receives the count termination signal of said timer applied to said control means therein, interrupts the execution of a set of microinstructions, activates a refresh execution unit for generating a refresh cycle, and resumes the execution of the set of microinstructions when the refresh cycle is finished.

3. A microcomputer having a refresh function and comprising:

a CPU including a control storage unit for storing a set of microinstructions and control means for controlling the order of executing microinstructions by specifying addresses for storing the set of microinstructions, and a timer for specifying a time interval of a refresh cycle for a dynamic memory, wherein a count termination signal of said timer is input into said control means;

wherein said CPU comprises a refresh execution unit in which the operation of refreshing said dynamic memory is effected by a logic circuit.

4. The microcomputer according to claim 3, wherein a microinstruction sequencer provided for said CPU as said control means comprises a microinstruction head address latch circuit for holding a head address signal indicating the head address of a set of microinstructions corresponding to an instruction of said CPU, a microinstruction next address latch circuit for holding a next address signal indicating the address of a microinstruction to be executed next, and a sequencer control unit for controlling which contents are to be output to said microinstruction address bus between said microinstruction head address latch circuit and said microinstruction next address latch circuit, and for controlling the suspension of the operation of said microinstruction sequencer during the operation of said refresh execution unit.

5. A microcomputer having a refresh function, comprising:

a timer for specifying a time interval of a refresh cycle for a dynamic memory and for generating a count termination signal when said time interval lapses, and a CPU for executing said refresh cycle responsive to said count termination signal, said CPU including:

a control storage unit for storing a set of microinstructions, and a means for controlling an execution order of said set of microinstructions by specifying addresses of microinstructions to be retrieved from said control storage unit.

6. The microcomputer according to claim 5, wherein a microinstruction sequencer provided for said CPU as said control means comprises a microinstruction head address latch circuit for holding a head address signal indicating the head address of a set of microinstructions corresponding to an instruction of said CPU, a microinstruction next address latch circuit for holding a next address signal indicating the address of a microinstruction to be executed next, a microinstruction special address latch circuit for generating and holding the head address of another set of microinstructions for performing refresh operation, a microinstruction stack for temporarily saving the contents of said microinstruction next address latch circuit, and a sequencer control unit for controlling which contents are to be output to a microinstruction address bus among said microinstruction head address latch circuit, said microinstruction next address latch circuit, said microinstruction special address latch circuit, or said microinstruction stack.

7. The microcomputer according to claim 5, wherein said control storage unit provided for said CPU comprises a microinstruction ROM unit for storing microinstructions, a microinstruction output latch circuit for holding the address of a microinstruction supplied from said microinstruction ROM unit and to be executed next, and a microinstruction output latch circuit for holding a control code supplied from said microinstruction ROM unit.

8. The microcomputer of claim 3, wherein said CPU receives said count termination signal of said timer applied to said means for controlling therein, interrupts execution of a first subset of said set of microinstructions, executes a second subset of said set of microinstructions for generating said refresh cycle, and resumes execution of said first subset of microinstructions when execution of said second subset of microinstructions for generating said refresh cycle is complete.

9. The microcomputer of claim 5, wherein said CPU receives said count termination signal of said timer applied to said means for controlling therein, interrupts execution of said set of microinstructions, activates a refresh execution unit for generating said refresh cycle, and resumes execution of said set of microinstructions when said refresh cycle is finished.

10. The microcomputer of claim 5, wherein said CPU comprises a refresh execution unit in which said refresh cycle for said dynamic memory is effected by a logic circuit.

* * * * *